United States Patent
Kitamura et al.

(10) Patent No.: US 9,428,246 B2
(45) Date of Patent: Aug. 30, 2016

(54) BICYCLE GENERATOR AND/OR SHIFTING DEVICE

(75) Inventors: Satoshi Kitamura, Osaka (JP);
Shintaro Mori, Osaka (JP)

(73) Assignee: Shimano Inc., Osaka (JP)

(*) Notice: Subject to any disclaimer, the term of this patent is extended or adjusted under 35 U.S.C. 154(b) by 853 days.

(21) Appl. No.: 13/316,105

(22) Filed: Dec. 9, 2011

(65) Prior Publication Data

US 2013/0145885 A1    Jun. 13, 2013

(51) Int. Cl.
*B62M 25/08* (2006.01)
*B62M 25/06* (2006.01)
*B60L 11/00* (2006.01)

(52) U.S. Cl.
CPC ............ *B62M 25/08* (2013.01); *B60L 11/007* (2013.01); *B60L 2200/12* (2013.01); *B60L 2220/44* (2013.01); *B60L 2240/421* (2013.01); *B60L 2240/547* (2013.01); *B60L 2250/16* (2013.01); *Y02T 10/642* (2013.01); *Y10T 74/2003* (2015.01)

(58) Field of Classification Search
CPC .. B62M 25/02; B62M 25/04; B62M 25/045; B62M 25/06; B62M 6/08
USPC .............. 74/473.1, 473.12–473.14, 473.16, 74/502.2, 501.6, 575, 577 R; 307/9.1; 310/67 A, 67 R; 180/65.1, 65.6, 220, 180/230, 65.285, 65.23, 65.265, 65.25; 475/149, 269, 331
See application file for complete search history.

(56) References Cited

U.S. PATENT DOCUMENTS

| | | | |
|---|---|---|---|
| 4,559,462 A * | 12/1985 | Hernandez-Badillo | 310/67 A |
| 5,341,892 A | 8/1994 | Hirose et al. | |
| 5,470,277 A | 11/1995 | Romano | |
| 6,204,775 B1 | 3/2001 | Kubacsi | |
| 6,296,072 B1 * | 10/2001 | Turner | 180/220 |
| 6,380,731 B1 | 4/2002 | Nishimoto | |
| 6,605,884 B2 * | 8/2003 | Nishimoto | 310/67 A |
| 6,993,995 B2 * | 2/2006 | Fujii | 74/502.2 |
| 7,059,989 B2 * | 6/2006 | Fukui | 475/149 |
| 7,119,668 B2 * | 10/2006 | Kitamura et al. | 340/432 |
| 7,195,088 B2 * | 3/2007 | Matsueda et al. | 180/206.5 |
| 8,142,046 B2 * | 3/2012 | Lin | 362/192 |
| 8,278,789 B2 * | 10/2012 | Nakano | 310/67 A |

(Continued)

FOREIGN PATENT DOCUMENTS

| | | |
|---|---|---|
| DE | 41 09 006 A1 | 9/1992 |
| DE | 20 2010 014 043 U1 | 12/2010 |

(Continued)

OTHER PUBLICATIONS

U.S. Appl. No. 13/162,710, filed Jun. 17, 2011, Kitamura et al.

*Primary Examiner* — William Kelleher
*Assistant Examiner* — Jude Agendia
(74) *Attorney, Agent, or Firm* — Global IP Counselors

(57) ABSTRACT

A bicycle generator or a shifting device has a base member, a rotation receiving member and a dynamo. The base member is configured to be mounted only in vicinity of a hub axle. The rotation receiving member is rotatably mounted on the base member and is rotated by a rotational part of a bicycle. The dynamo is coupled to the rotation receiving member to generate electrical energy in response to rotation of the rotation receiving member. In the case of the shifting device, a shifting unit is provided that includes an electric motor and an output member that engages a part of a bicycle hub transmission device.

28 Claims, 9 Drawing Sheets

(56) References Cited

U.S. PATENT DOCUMENTS

| | | | |
|---|---|---|---|
| 8,602,145 B2* | 12/2013 | Su et al. | 180/65.51 |
| 8,655,561 B2* | 2/2014 | Kitamura | 701/51 |
| 2004/0079612 A1* | 4/2004 | Endo et al. | 192/217 |
| 2005/0029879 A1 | 2/2005 | Endo et al. | |
| 2005/0285461 A1* | 12/2005 | Kitamura et al. | 310/67 A |
| 2008/0114519 A1* | 5/2008 | DuFaux et al. | 701/70 |
| 2008/0227588 A1* | 9/2008 | Urabe | 475/297 |
| 2010/0301771 A1* | 12/2010 | Chemel et al. | 315/294 |
| 2011/0116278 A1 | 5/2011 | Lin | |
| 2011/0156543 A1* | 6/2011 | Nakano | 310/67 A |
| 2011/0304200 A1* | 12/2011 | Saida et al. | 307/9.1 |
| 2013/0015009 A1* | 1/2013 | Lin et al. | 180/220 |

FOREIGN PATENT DOCUMENTS

| | | |
|---|---|---|
| JP | 61-104741 U | 7/1986 |
| JP | 02-024796 U | 2/1990 |
| JP | 3164621 U | 11/2010 |
| TW | 201105535 A1 | 2/2011 |

* cited by examiner

BICYCLE GENERATOR AND/OR SHIFTING DEVICE

BACKGROUND

1. Field of the Invention

This invention generally relates to a bicycle generator and/or a shifting device. More specifically, the present invention relates to a bicycle generator and/or shifting device including a dynamo for generating electric power.

2. Background Information

Recently, bicycles have been equipped with various electrical components to make riding easier and more enjoyable for the rider. Some bicycles are equipped with electrically controlled shifting systems. These electrically controlled shifting systems can be automatically operated based on bicycle riding conditions or can be manually operated by the rider as desired. Such electrically controlled shifting systems require electricity from a power source to operate. Some bicycles are provided with a battery as a power source for the electrical components. Some bicycles are provided with a wheel hub generator as a power source for the electrical components. In any case, an electrical power source is needed for bicycles equipped with various electrical components.

SUMMARY

One aspect presented in this disclosure is to provide a bicycle generator or a bicycle shifting device that generates electrical energy for operating one or more electrical bicycle components.

In view of the state of the known technology, a bicycle generator or a bicycle hub transmission shifting device is provided that includes a base member, a rotation receiving member and a dynamo. The base member is configured to be mounted only in vicinity of a hub axle. The rotation receiving member is rotatably mounted on the base member and configured to be rotated by a rotational part of a bicycle. The dynamo is supported on the base member and is operatively coupled to the rotation receiving member. The dynamo generates electrical energy in response to rotation of the rotation receiving member.

In the case of the bicycle hub transmission shifting device, a shifting unit is further provided that includes an electric motor and an output member that engages a part of a bicycle hub transmission device. An electrical storage unit is electrically coupled to the electric motor to supply electrical energy from the electrical storage unit.

These and other objects, features, aspects and advantages of the disclosed bicycle generator or bicycle hub transmission shifting device invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
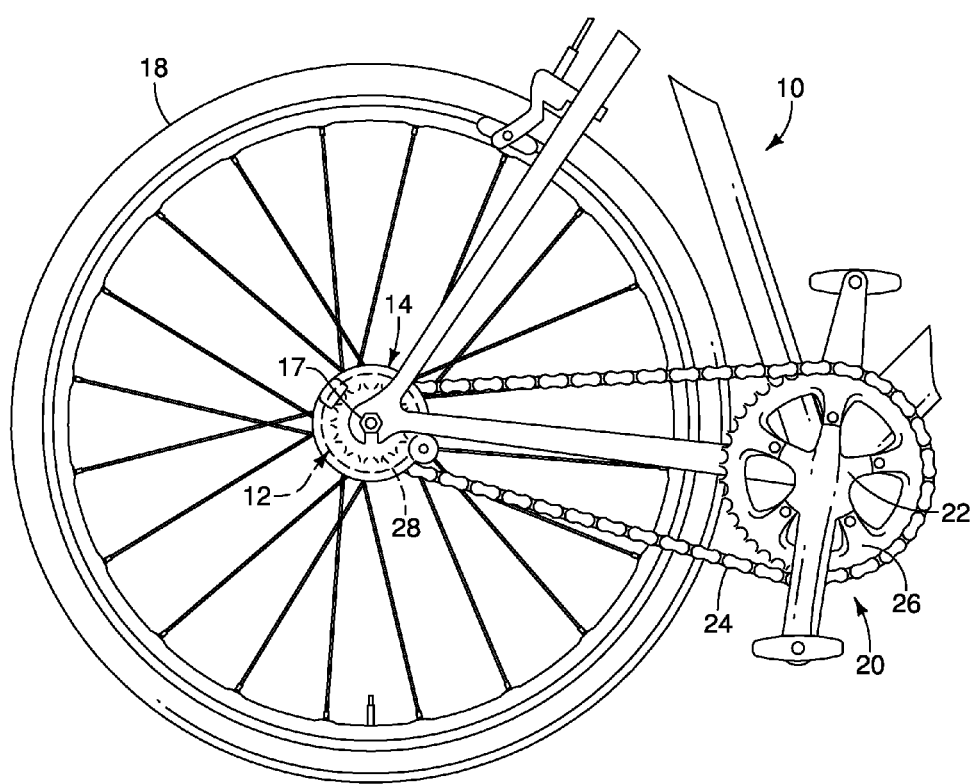
FIG. 1 is a partial side elevational view of a rear portion of the bicycle that is equipped with an internal hub transmission (e.g., an internally geared hub) and a bicycle generator in the form of a bicycle hub transmission shifting device that generates electrical power for operating one or more electrical components of the bicycle in accordance with one illustrative embodiment.

Referring initially to FIG. 1, a portion of a bicycle 10 is illustrated that is equipped with an internally geared hub 12 and a bicycle generator 14 in accordance with one illustrated embodiment. As explained below, the bicycle generator 14 is attached to a bicycle rear hub with transmission and generates electrical power for at least one electrical component of the bicycle 10. If the bicycle generator 14 includes parts for shifting the internally geared hub 12, as in the first illustrated embodiment, then the bicycle generator 14 also constitutes a bicycle hub transmission shifting device.

In the first illustrated embodiment, the internally geared hub 12 is an electrically operated device, in which the bicycle generator 14 (bicycle hub transmission shifting device) shifts the internally geared hub 12. The internally geared hub 12 is mounted on a rear portion of a bicycle frame 16 of the bicycle 10 by a pair of nuts 17. The internally geared hub 12 also forms a part of a rear wheel 18 of the bicycle 10. Also the internally geared hub 12 forms a part of a drive train 20 of the bicycle 10. Typically, in addition to the internally geared hub 12, the drive train 20 further includes a front crankset 22 and a chain 24. The chain 24 is a conventional bicycle chain that engages a chain ring 26 of the front crankset 22 and a rear drive sprocket 28 of the internally geared hub 12. The rear drive sprocket 28 constitutes one example of a drive member of the internally geared hub 12.

Figure 2:
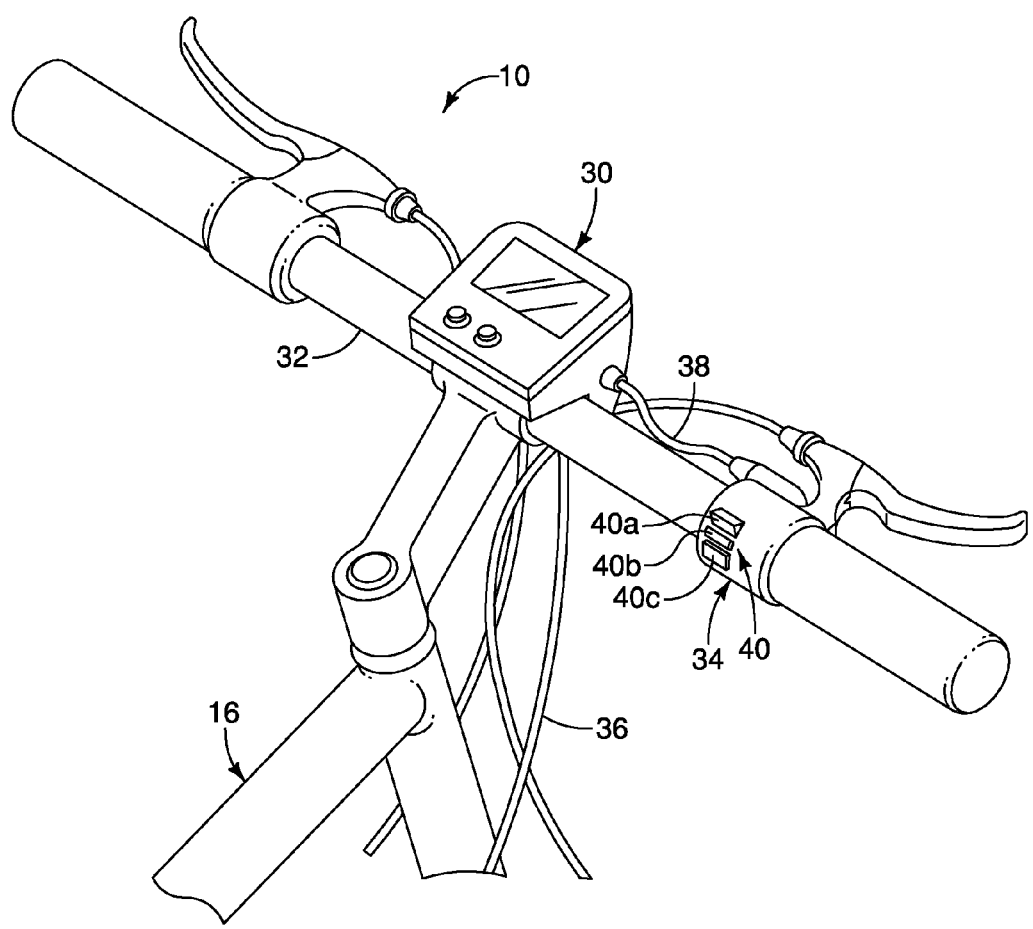
FIG. 2 is a perspective view of the handlebar area of the bicycle illustrated in FIG. 1, with a control unit and a plurality of operating or input devices mounted to a straight type handlebar.

As seen in FIG. 2, the bicycle 10 further includes a computer unit 30 that is mounted to a handlebar 32 of the bicycle 10. The computer unit 30 is preferably a bicycle computer that measures, calculates and displays various riding parameters such as bicycle speed, distance traveled, pedaling speed, pedaling cadence etc. The computer unit 30 includes a microcomputer with control circuits having one or more CPUs, storage units, computation units and the like. The microcomputer also includes software that outputs the predetermined parameters in accordance with the input signals outputted from an input device 34 and other input devices (not shown).

As seen in FIG. 2, the computer unit 30 is operatively connected to the input device 34, which constitutes a remote input device 34, for shifting the internally geared hub 12. The input device 34 is preferably mounted on the handlebar 32 of the bicycle 10, but could be mounted in other places as needed and/or desired. The input device 34 constitutes one example of a manually operated input member in the form of a plurality of switches. The input device 34 selectively output input signals to the bicycle generator 14 to change a shift setting of the internally geared hub 12. The computer unit 30 is not necessary for the operation of the internally geared hub 12. Also the term "signal" as used herein is not limited to an electrical signal, but includes other types of signals such as a command.

As seen in FIG. 2, the computer unit 30 is provided with a wiring harness 36 that may be connected to the bicycle generator 14 and a wire 38 that is connected to the input device 34. Thus, the input signals outputted from the input device 34 can be relayed to the internally geared hub 12 by the computer unit 30 as needed and/or desired. However, the input device 34 can be configured to send signals directly to the bicycle generator 14 as needed and/or desired. The input device 34 can be connected to the bicycle generator 14 by a wire or through wireless communications. When the input device 34 is connected to the bicycle generator 14 by wireless communications, the wiring harness 36 and the wire 38 are not needed.

Figure 3:
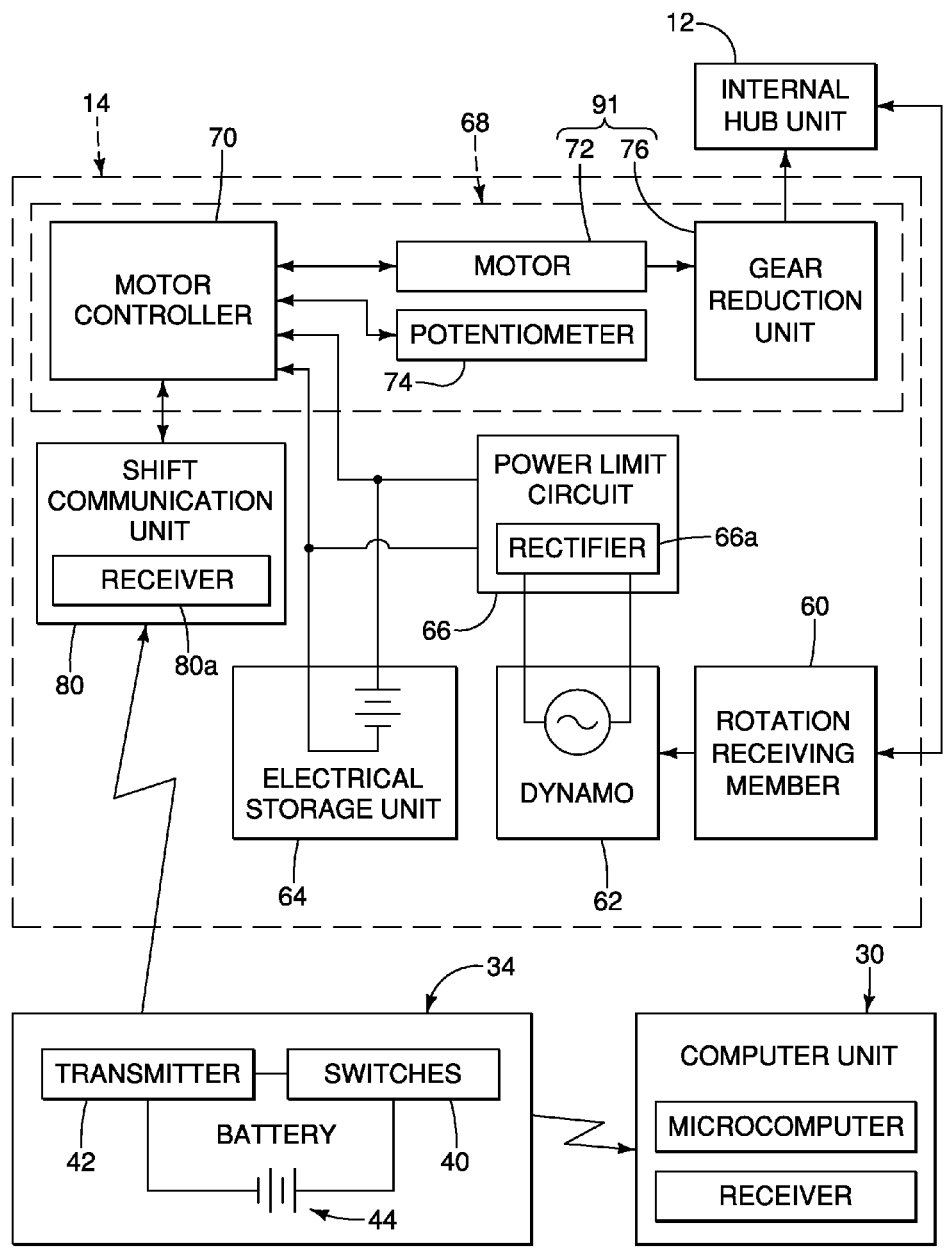
FIG. 3 is a schematic block diagram showing an entire configuration of the bicycle component control apparatus.

As seen in FIG. 3, the input device 34 can wirelessly communicates directly with the internally geared hub 12 and directly with the computer unit 30. In this situation, the computer unit 30 does not communicate with the bicycle generator 14. When the input device 34 wirelessly communicates directly with the internally geared hub 12, the input device 34 is preferably provided with one or more switches 40 and a transmitter 42 for wirelessly outputting switch signals (e.g., upshift and downshift signals) to change the speed stage of the internally geared hub 12. As seen in FIG. 2, the input device 34 is provided with three switches 40 an upshift switch 40a, a mode switch 40b and a downshift switch 40c). The mode switch is used for, among other things, switching between a manual shilling mode and an automatic shifting mode.

Preferably, the input device 34 also includes a battery or power supply 44 that serves as a power source for the switches 40 and the transmitter 42. The battery 44 can be, for example, a nickel hydrogen battery or a lithium ion battery that is either replaceable or rechargeable.

Figure 4:
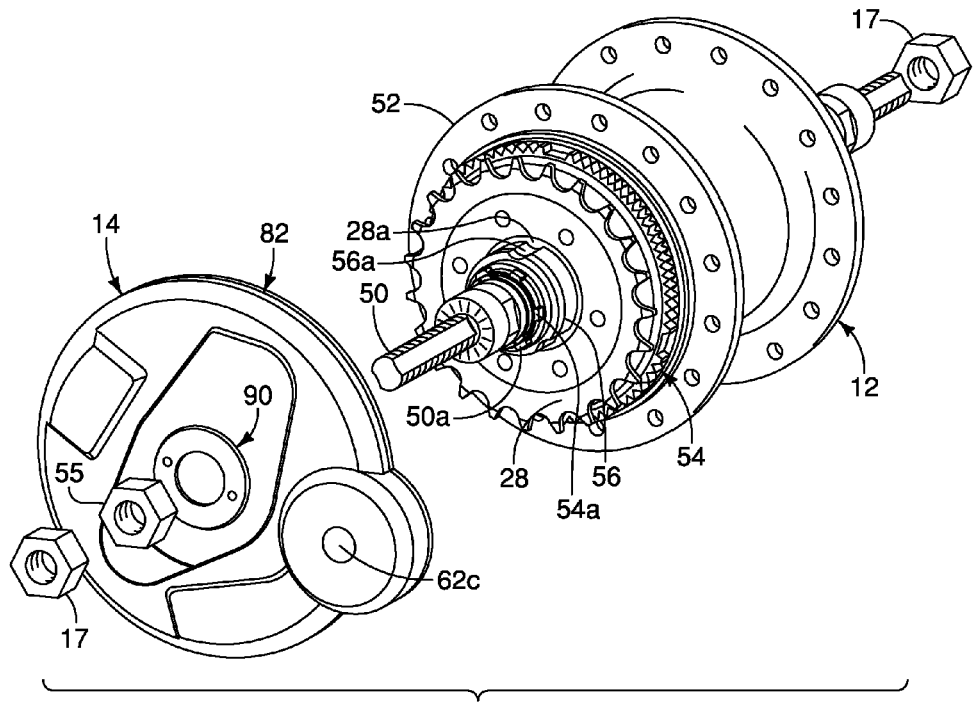
FIG. 4 is an exploded perspective view of the internally geared hub and bicycle generator as viewed from the chain side of the internally geared hub and showing the bicycle generator about to be mounted to the hub axle of the internally geared hub.
Figure 5:
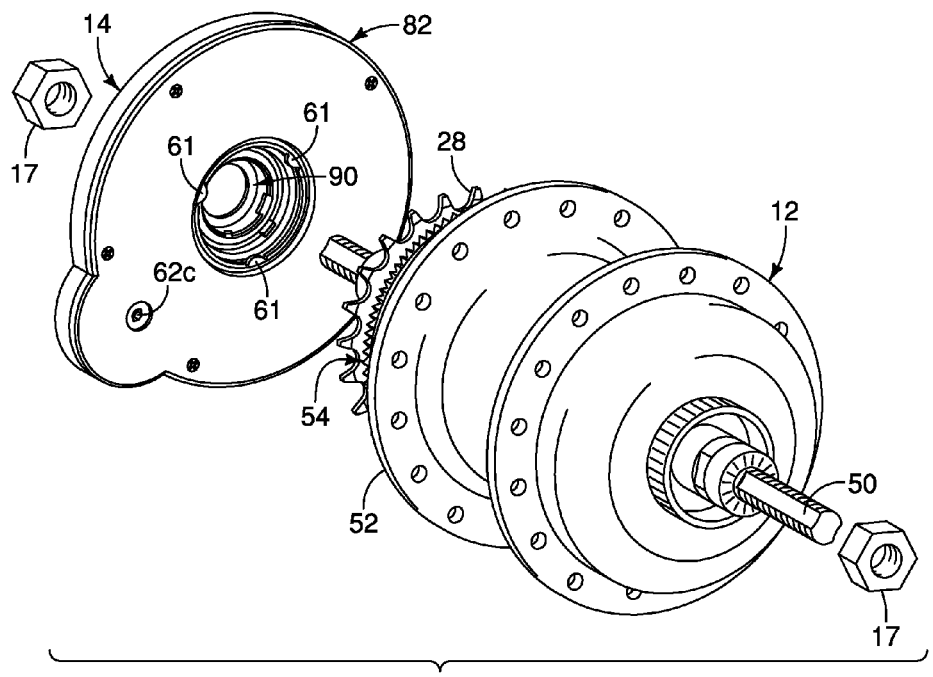
FIG. 5 is an exploded perspective view of the internally geared hub and bicycle generator as viewed from the non-chain side of the internally geared hub and showing the bicycle generator about to be mounted to the hub axle of the internally geared hub.
Figure 6:
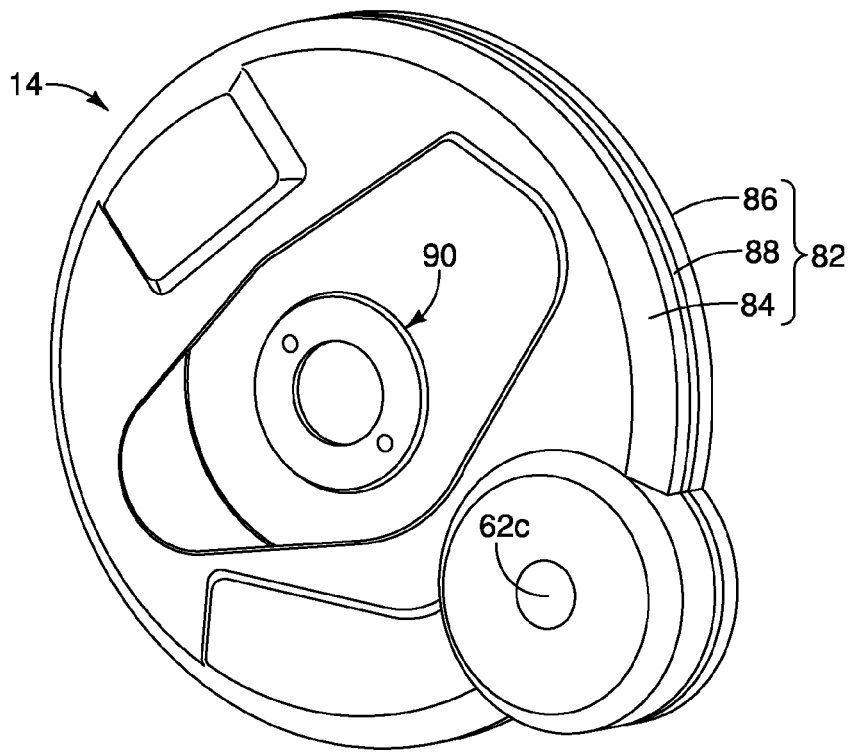
FIG. 6 is a perspective view of the bicycle generator as viewed from the outbound side of the bicycle generator.
Figure 7:
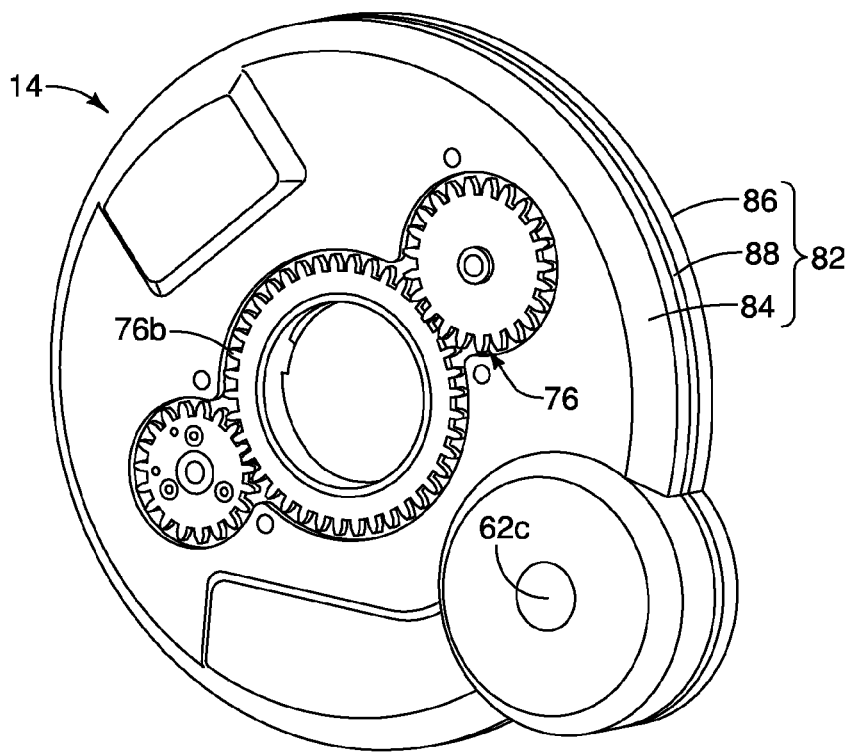
FIG. 7 is a perspective view of the bicycle generator as viewed from the outbound side of the bicycle generator but with the hub mounting portion of the base member removed show selected interior parts.

Referring now to FIGS. 4 and 5, the internally geared hub 12 constitutes a bicycle hub that basically includes a hub axle 50, a hub shell 52 and a bicycle hub transmission 54. The nuts 17 are threaded onto the free ends of the hub axle 50 to secure the internally geared hub 12 to the frame of the bicycle 10 in a conventional manner. The hub shell 52 rotates around the hub axle 50 with the hub transmission 54 being operatively disposed between the hub shell 52 and the hub axle 50. The hub axle 50 defines an axle or rotational axis of the hub shell 52 of the internally geared hub 12. The hub transmission 54 can be any type of gear ratio changing device such as a planetary gear transmission or a continuously variable transmission (CVT). For example, the hub transmission 54 can be a planetary gear transmission such as those sold by Shimano, Inc. under the brand name Nexus®. Since the hub transmission 54 can be any type of gear ratio changing device, the particulars of the hub transmission 54 will not be discussed herein. In any case, the hub transmission 54 has a control part 54a for changing the gear ratio of the hub transmission 54. In the illustrated embodiment, the control part 54a is rotationally mounted to the hub axle 50. The hub transmission 54 is shifted between different gear ratios by rotating the control part 54a. The selected gear ratio of the hub transmission 54 will depend on the rotational position of the control part 54a relative the hub axle 50.

The rear drive sprocket 28 is rotatably mounted on the hub axle 50. The rear drive sprocket 28 is operatively connected to the hub shell 52 via the hub transmission 54. Thus, the rear drive sprocket 28 applies a driving force from the chain 24 to the hub transmission 54 that is located within the hub shell 52 for communicating the drive force from the chain 24 to the hub shell 52 through a plurality of power transmission paths in a well-known manner. Since hub transmissions are known structures, a detailed description of the hub transmission 54 shall be omitted for the sake of brevity. A conventional hub brake (not shown) also can be used with the internally geared hub 12 as needed and/or desired. One example of such a conventional hub brake is sold Shimano, Inc. under the brand name Nexus®. Also typically, the hub transmission 54 is provided with a one-way clutch (not shown) so that the rear drive sprocket 28 can stop rotating while the hub shell 52 continues to rotate in a forward rotational direction during coasting.

The bicycle generator 14 is secured on the hub axle 50 solely by using a nut 55. The nut 55 constitutes one example of a lock member for detachably fixing the bicycle generator 14 in a lateral direction on the huh axle 50. Of course, other types of lock members can be used. For example, a C-shaped retaining clip could be installed in a groove on the hub axle 50 to detachably fix the bicycle generator 14 in a lateral direction on the hub axle 50.

The bicycle generator 14 receives a rotational input from the internally geared hub 12 to generate electrical energy. This rotational input from the internally geared huh 12 can be accomplished in many different ways. In the first illustrated embodiment, as seen in FIG. 4, the internally geared hub 12 includes a rotational part 56, which is a part of the hub transmission 54. In the first illustrated embodiment, the rotational part 56 is rotatably mounted on the hub axle 50. The configuration and location of the rotational part 56 will depend on the particular construction of the hub transmission 54. In any case, preferably as illustrated herein, the rotational part 56 is a part that is rotatable relative to the hub shell 52 of the internally geared hub 12 and that is rotated in response to rotation of the rear drive sprocket 28.

The rotational part 56 can be either directly or indirectly coupled to the rear drive sprocket 28 such that the rear drive sprocket 28 and the rotational part 56 rotate together. In the case of the illustrated embodiments, rotational part 56 has a plurality of (e.g. three) notches 56a that receive tabs 28a of the rear drive sprocket 28 so that they rotate together. The notches 56a are also engaged by the bicycle generator 14 to generate electrical energy as discussed below.

Also in the case of the illustrated embodiments, the hub transmission 54 is provided with a one-way clutch (not shown) that is located within the hub shell 52 in the transmission path between the rear drive sprocket 28 and the hub shell 52. This one-way clutch allows the rear drive sprocket 28 and the rotational part 56 to rotate relative to the hub shell 52. Accordingly, the hub shell 52 constitutes a driven member, while the rotational part 56 constitutes a drive member. The rear drive sprocket 28 may constitutes a part of the drive member.

Referring again to FIG. 3, the bicycle generator 14 will now be discussed in more detail. The internally geared hub 12 constitutes one example of an internal hub unit that is operated by the bicycle generator 14. The bicycle generator 14 includes a rotation receiving member 60, a dynamo 62, an electrical storage unit 64 and a power limit circuit 66. In the case of the bicycle generator 14 being configured as a bicycle hub transmission shifting device, a shifting unit 68 is further provided that includes a motor controller 70, an electric motor 72, a potentiometer 74 and a gear reduction unit 76. Preferably, the bicycle generator 14 further includes a shift communication unit 80 that is electrically coupled to the motor controller 70 to input control signals to the motor controller 70 as seen in FIG. 3.

As seen in FIGS. 6 to 9, the bicycle generator 14 includes a base member 82 that supports and houses the rotation receiving member 60, the dynamo 62, the electrical storage unit 64, the power limit circuit 66, the shifting unit 68 and the shift communication unit 80. The shifting unit 68 includes the motor controller 70, the electric motor 72, the potentiometer 74 and the gear reduction unit 76. The base member 82 includes an outbound cover 84, an inbound cover 86 and a mounting plate 88. The outbound cover 84 and the inbound cover 86 are fixedly connected to the mounting plate 88 form a housing for the rotation receiving member 60, the dynamo 62, the electrical storage unit 64, the power limit circuit 66, the shifting unit 68 and the shift communication unit 80. The base member 82 further includes a hub mounting portion 90 that is fixed to the outbound cover 84. The hill) mounting portion 90 is configured to be fixedly and non-rotatably attached to the hub axle 50. For example, in the first embodiment, the hub mounting portion 90 has a plurality of notches 90a that engage a pair of projections of a non-rotational part 50a (seen FIG. 4) that is non-rotatably fixed to the hub axle 50.

The base member 82 is configured to be mounted only in vicinity of the hub axle 50. Preferably, the base member 82 is non-rotatably secured on the hub axle 50 by the nut 55 such that the notches 90a of the huh mounting portion 90 engage the projections of the non-rotational part 50a of the hub axle 50. While the non-rotational part 50a is separate part from the hub axle 50 in the first illustrated embodiment, the non-rotational part 50a can be a portion of the hub axle 50 itself. In either case, the hub mounting portion 90 is located completely within an outer diameter of the hub shell 52 as view from a lateral direction along the hub axle 50. The base member 82 is solely supported on the hub axle 50. The base member 82 is not supported by the frame of the bicycle 10. Moreover, the base member 82 is not directly attached to the frame of the bicycle 10 to prevent rotation of the base member 82 on the hub axle 50. Thus, the internally geared hub 12 and the bicycle generator 14 can be separated from the frame of the bicycle 10 as an integrated unit.

Basically, the rotation receiving member 60 is configured to be rotate by the rotational part 56 of the internally geared hub 12. The dynamo 62 is operatively connected to the rotation receiving member 60 for generating electrical energy in response to the rotation receiving member 60 being rotated by the internally geared hub 12 as discussed below. The electrical storage unit 64 is electrically coupled to the dynamo 62 to store electrical energy generated by the dynamo 62. The electrical storage unit 64 includes at least one of a capacitor and a battery for storing the electrical energy generated by the dynamo 62. Also, in this illustrated embodiment, the power limit circuit 66 is provided for converting alternating current (AC) produced by the dynamo 62 to direct current (DC). Preferably, the power limit circuit 66 includes a rectify device 66a rectifies the current from the dynamo 62 for converting alternating current (AC) produced by the dynamo 62 to direct current (DC).

Figure 10:
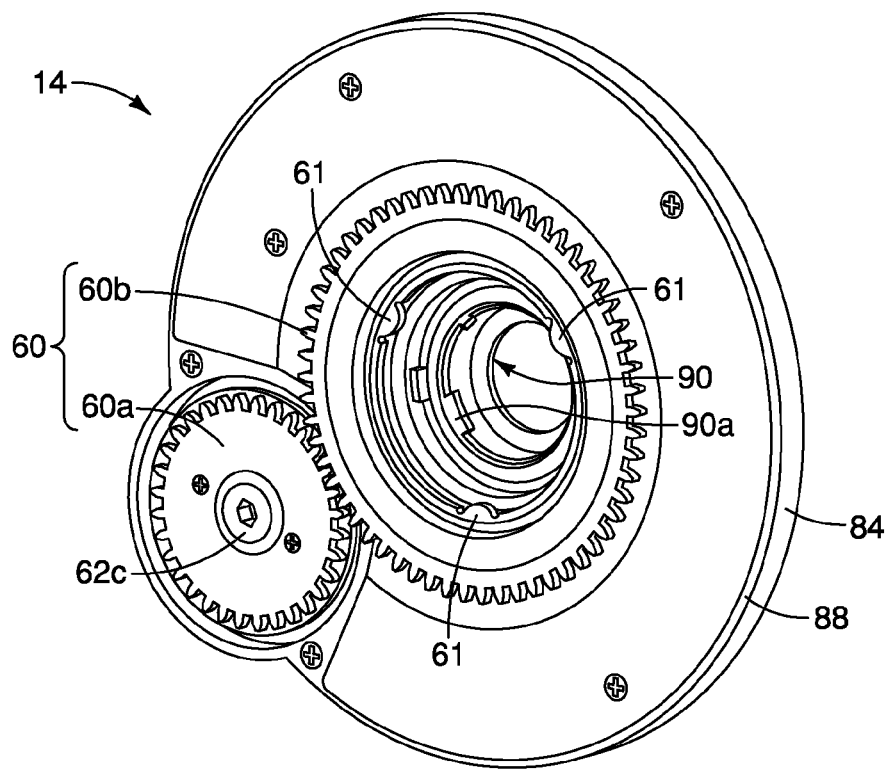
FIG. 10 is a perspective view of the bicycle generator as viewed from the inbound side of the bicycle generator but with the inbound cover of the base member removed to show selected interior parts.
Figure 11:
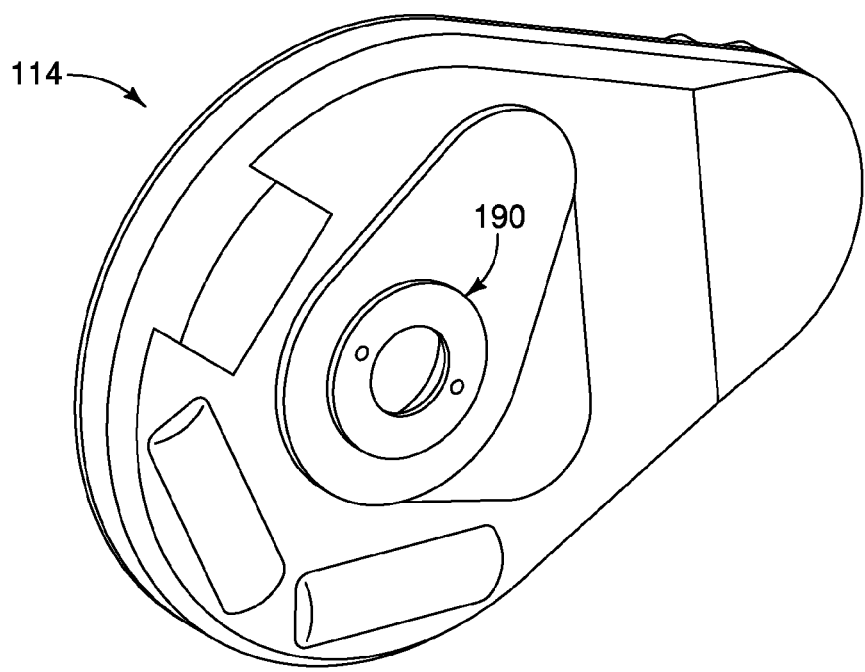
FIG. 11 is a perspective view of a bicycle generator in accordance with a second embodiment as viewed from the outbound side of the bicycle generator.
Figure 12:
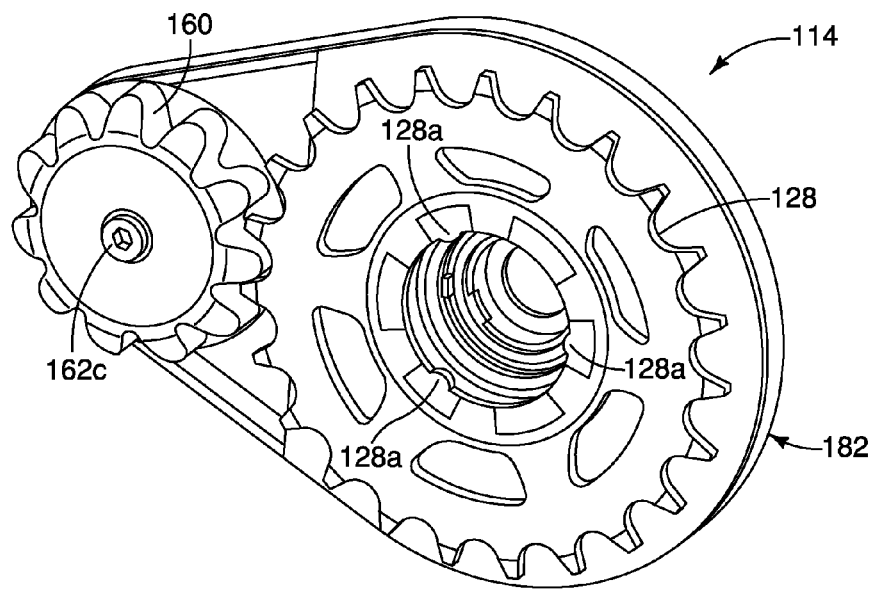
FIG. 12 is a perspective view of the bicycle generator of FIG. 11 as viewed from the inbound side of the bicycle generator and showing the engagement with the rear drive sprocket.
Figure 13:
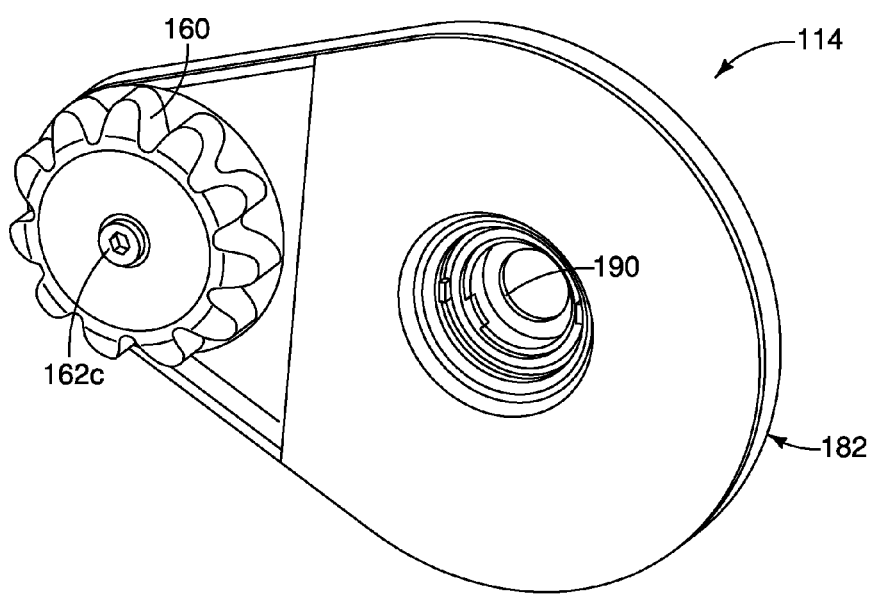
FIG. 13 is a perspective view of the bicycle generator of FIGS. 11 and 12 as viewed from the inbound side of the bicycle generator but with the rear drive sprocket removed.

As seen in FIG. 10, the rotation receiving member 60 is rotatably mounted on the base member 82 and configured to be rotate by the rotational part 56 of the bicycle hub 12. The dynamo 62 is supported on the base member 82, and is operatively coupled to the rotation receiving member 60. The rotation receiving member 60 is configured and arranged to be operatively coupled to the rotational part 56, which is rotatably arranged relative to the hub shell 52 of the bicycle hub 12.

The dynamo 62 generates electrical energy in response to the rotation receiving member 60 being operatively rotated by the rotational part 56 of the bicycle hill) 12. The dynamo 62 is electrically connected to the electrical storage unit 64 for supplying electrical energy to the electrical storage unit 64 that was generated by the dynamo 62. The dynamo 62 also provides electrical energy either directly or indirectly via the electrical storage unit 64 to the electrically operated parts of the shifting unit 68 (e.g., the motor controller 70, the electric motor 72 and the potentiometer 74).

Figure 8:
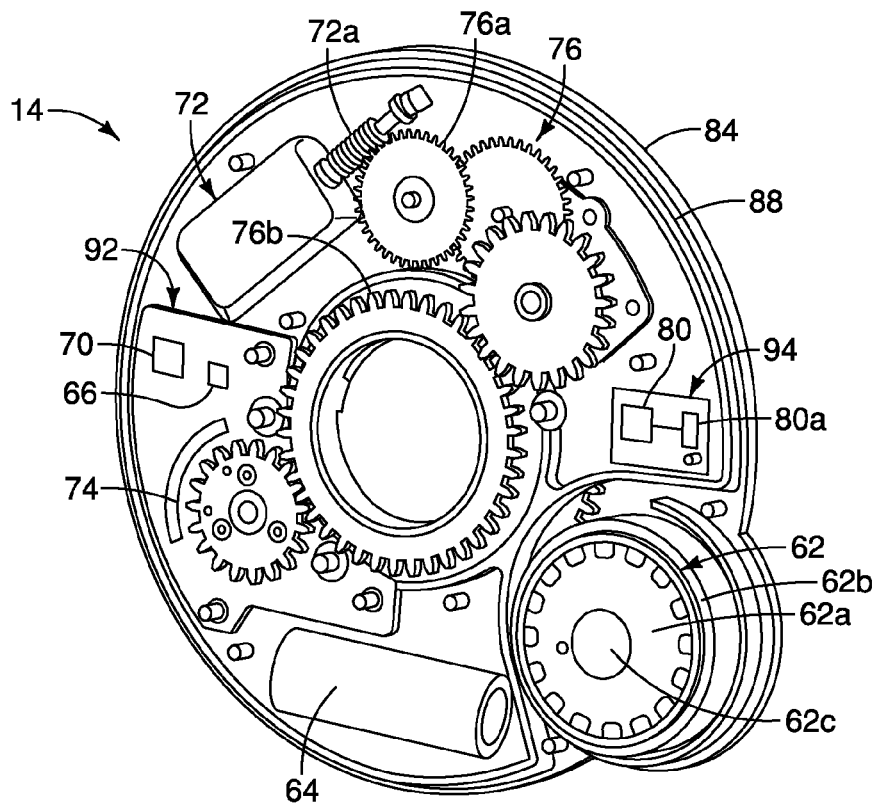
FIG. 8 is a perspective view of the bicycle generator as viewed from the outbound side of the bicycle generator but with the outbound cover of the base member removed to show selected interior parts.
Figure 9:
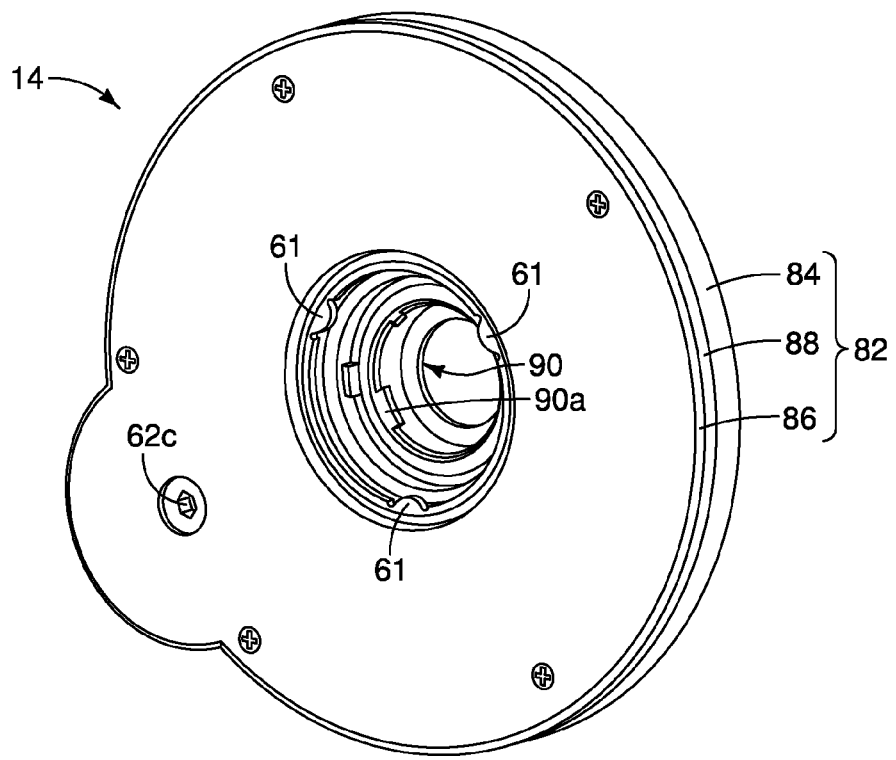
FIG. 9 is a perspective view of the bicycle generator as viewed from the inbound side of the bicycle generator.

As seen in FIG. 8, the dynamo 62 basically includes a stator 62a and a rotor 62b. The rotor 62b has one or some permanent magnet(s) which has a plurality of pole fir creating a constant magnetic field and a yoke which covers the permanent magnet. The stator 62a has a plurality of armature windings to generate the electric current as the armature windings passes through the magnetic field of the permanent magnets on the rotor 62b. Thus, the rotor 62b and the stator 62a form an electric generator that uses electromagnetic principles to convert mechanical energy (rotation of the rotation receiving member 60) to electrical energy (alternating current). In the illustrated embodiment, the stator 62a is a stationary spool like member, while the rotor 62b is a rotating ring that has the stator 62a disposed therein.

In particular, as seen in FIG. 10, the rotation receiving member 60 includes a first gear 60a and a second gear 60b. The second gear 60b includes three tabs 61 that engage the notches 56a of the rotational part 56. Thus, the second gear 60b is an input gear of the rotation receiving member 60 that is rotated when the chain 24 rotates the rear drive sprocket 28. The stator 62a has an axle 62c that rotatably supports the rotor 62b. The second gear 60b is rotatably supported by the base member 80. The teeth of first gear 60a and the teeth of second gear 60b are engaged each other. The first gear 60a is rotatably supported by the axle 62c. The rotor 62b is fixed to the first gear 60a such that the rotor 62b and the first gear 60a rotate together as a unit. The first gear 60a is coupled to a coupling member, which is coupled to a yoke (not shown) of the rotor 62b. The stator 62a is non-rotatably mounted such that the rotor 62b rotates outside the stator 62a to generate electrical energy in response to the rotation receiving member 60 being rotated by the bicycle chain 24. Of course, the rotor and the stator may be reversed from the arrangement that is shown such that the stator is a stationary ring with the rotor being a spool inside of the stator. In other words, the rotor can rotate inside the stator.

The electrical storage unit 64 is electrically coupled to the dynamo 62 to store electrical energy generated by the dynamo 62. When the bicycle generator 14 is connected to the computer unit 30 by the wiring harness 36 and to the input device 34 by the wire 38 (FIG. 2), the electrical storage unit 64 can supply electrical power to the computer unit 30 and the input device 34. As seen in FIG. 8, the electrical storage unit 64 (e.g., one or more batteries, accumulators or capacitors as shown) is, for example, a nickel hydrogen battery or a lithium ion battery. The electrical storage unit 64 constitutes an electrical energy storage device or storage element that serves as a power source for the bicycle generator 14 and other electrical bicycle components.

As seen in FIG. 3, the motor controller 70, the electric motor 72, the potentiometer 74 are electrically coupled to the electrical storage unit 64 such that the motor controller 70, the electric motor 72, the potentiometer 74 receive electrical energy from the electrical storage unit 64. The electric motor 72 is electrically coupled to the motor controller 70 to operate in response to a signal from the motor controller 70. The gear reduction unit 76 of the shifting unit 68 includes an input member or gear 76a coupled to an output shaft 72a of the electric motor 72 and an output member or gear 76b arranged to engage the control part 54a of the hub transmission 54 of the internally geared hub 12. The electric motor 72 and the gear reduction unit 76 constitute an electric motor unit 91 of the bicycle generator 14 that is configured to change the hub transmission 54. The electric motor unit 91 could be a separate part that is remotely located from the base member 82. However, in the case of the illustrated embodiments, the electric motor unit 91 is directly supported on the base member 82.

The electric motor 72 is, for example, a DC motor or a three-phase brushless DC motor with an output shaft 72a connected to the gear reduction unit 76. The electric motor 72 receives electrical energy directly or indirectly from the dynamo 62 as needed and/or desired. In the case of the illustrated embodiments, the electric motor 72 receives electrical energy indirectly from the dynamo 62 via the motor controller 70 and the electrical storage unit 64. If an AC motor is used for the electric motor 72, then the electric motor 72 will typically be provided with an inverter that converts DC current supplied from the electrical storage unit 64 to an AC current for powering the electric motor 72. Since electric motors are known structures, a detailed description of the electric motor 72 shall be omitted for the sake of brevity.

The potentiometer 74 is preferably coupled to a moving part of the gear reduction unit 76. The potentiometer 74 provides a signal indicating a current position of a moving part of the gear reduction unit 76 such that the electric motor 72 can be operated to upshift and downshift the internally geared hub 12 based on the switch signals from the switches 40. Since potentiometers are known structures, a detailed description of the potentiometer 74 shall be omitted for the sake of brevity. Alternatively, instead of using the potentiometer 74, a magnet and a Hall Effect sensor or device may be used for detecting a current position of the gear stage.

As seen in FIG. 3, the motor controller 70 is electrically coupled to the electrical storage unit 64 to receive electrical energy stored in the electrical storage unit 64. The electric motor 72 is also operatively coupled to the motor controller 70 to operate in response to a control signal from the motor controller 70. Specifically, the motor controller 70 operates the electric motor 72 by controlling the supply of the electrical energy stored in the electrical storage unit 64 to the electric motor 72 based on the signal from the potentiometer 74. The motor controller 70 includes a microcomputer (e.g. central processing unit (CPU)) and a motor driver. As the motor controller 70 operates the electric motor 72, the motor controller 70 detects the voltage of the electrical storage unit 64.

The shift communication unit 80 preferably includes a wireless receiver 80a that wirelessly receives a wireless shift signal from the wireless transmitter 42. The shift communication unit 80 can transmit information of the current position of the speed state to the computer unit 30 via the input device 34 such that the computer unit 30 can display the information of the current position on its display. Of course, the shift communication unit 80 can be electrically coupled to the switches 40 using one or more wires as needed and/or desired. For example, when the bicycle generator 14 is connected to the computer unit 30 by the wiring harness 36 and to the input device 34 by the wire 38, the shift communication unit 80 can transmit information of the current position of the speed state to the computer unit 30 via the wiring harness 36. The computer unit 30 can display the information of the current position on its display.

Preferably, as seen in FIG. 8, the base member 82 has a pair of printed circuit boards 92 and 94 (schematically illustrated in a very simplified form). The first circuit board 92 includes the power limit circuit 66, the motor controller 70 and the potentiometer 74. The second circuit board 94 includes the shift communication unit 80 and the wireless receiver 80a for conducting wireless communications with the transmitter 42 of the input device 34 as seen in FIG. 3. Thus, the wireless receiver 80a wirelessly receives a shift signal from the transmitter 42 when the rider operates one of the switches 40 of the input device 34 as seen in FIG. 3. However, the receiver of the shift communication unit 80 can be a wired to the transmitter 42 of the input device 34 as seen in FIG. 2.

Basically, the bicycle generator 14 generates electrical power using the chain 24 which rotates the dynamo 62 and stores the electrical power in the electrical storage unit 64, as discussed below. Also basically, the shift communication unit 80 receives switch signals from the switches 40 for outputting the control signals to the motor controller 70 for controlling the operation of the electric motor 72. In other words, the shift communication unit 80 is operatively coupled to the motor controller 70 to transmit a motor operation signal from the shift communication unit 80 to the motor controller 70 such that the motor controller 70 operated of the electric motor 72 to shift the internally geared hub 12. In this way, the rider can easily upshift and downshift the internally geared hub 12 by using the upshift and downshift switches 40a and 40c while in manual shifting mode. Alternatively, the rider can select an automatic shifting mode using the mode switch 40*b*. In the automatic shifting mode, the motor controller 70 automatically controls the electric motor 72 based on at least one of a bicycle speed, a bicycle acceleration, a bicycle deceleration and a bicycle inclination. The bicycle speed, the bicycle acceleration, the bicycle deceleration and the bicycle inclination are obtained using conventional sensors (not shown) that are operatively connected by wires and/or wirelessly to the computer unit 30 and/or the shift communication unit 80.

If the voltage of the electrical storage unit 64 is lower than a predetermined value as determined by the motor controller 70, then the motor controller 70 does not operates the electric motor 72. The motor controller 70 preferably is configured to include a sleep mode, when the wireless receiver 80*a* of the shift communication unit 80 does not receive a switch signal (upshift or downshift signal) from the switches 40 for predetermine time, the motor controller 70 enters the sleep mode to conserve energy. The motor controller 70 also enters the sleep mode, when the motor controller 70 does not detect velocity signal that is outputted by the dynamo 62 for a predetermine time. In other word, if the rotor 62*b* of the dynamo 62 does not move for a predetermine time, then the motor controller 70 enters a sleep mode. During the sleep mode, the motor controller 70 shuts down and stops monitoring the potentiometer 74 and/or communicating with the shift communication unit 80. Once the wireless receiver 80*a* of the shift communication unit 80 receives a switch signal (upshift or downshift signal) from the switches 40, the switch signal is inputted to the motor controller 70 so the motor controller 70 can wake up quickly. Also once the rotor 62*b* of the dynamo 62 starts to rotate again, the velocity signal from the dynamo 62 is inputted to the motor controller 70 so the motor controller 70 can wake up quickly when the chain 24 is moved.

Referring now to FIGS. 11 to 14, a bicycle generator 114 is illustrated in accordance with a second embodiment. The bicycle generator 114 is operationally identical to the bicycle generator 14. However, the arrangement of the parts of the bicycle generator 114 have been changed to accommodate connection of a rear drive sprocket 128 to the bicycle generator 114 as explained below. The bicycle generator 114 is used with the internally geared hub 12 that is discussed above. Moreover, such part of the second embodiment that has the same name as a part of the first embodiment has the same function and operation as the part of the first embodiment. In view of these similarities between the first and second embodiments, the second embodiment will not be discussed in detail herein.

Figure 14:
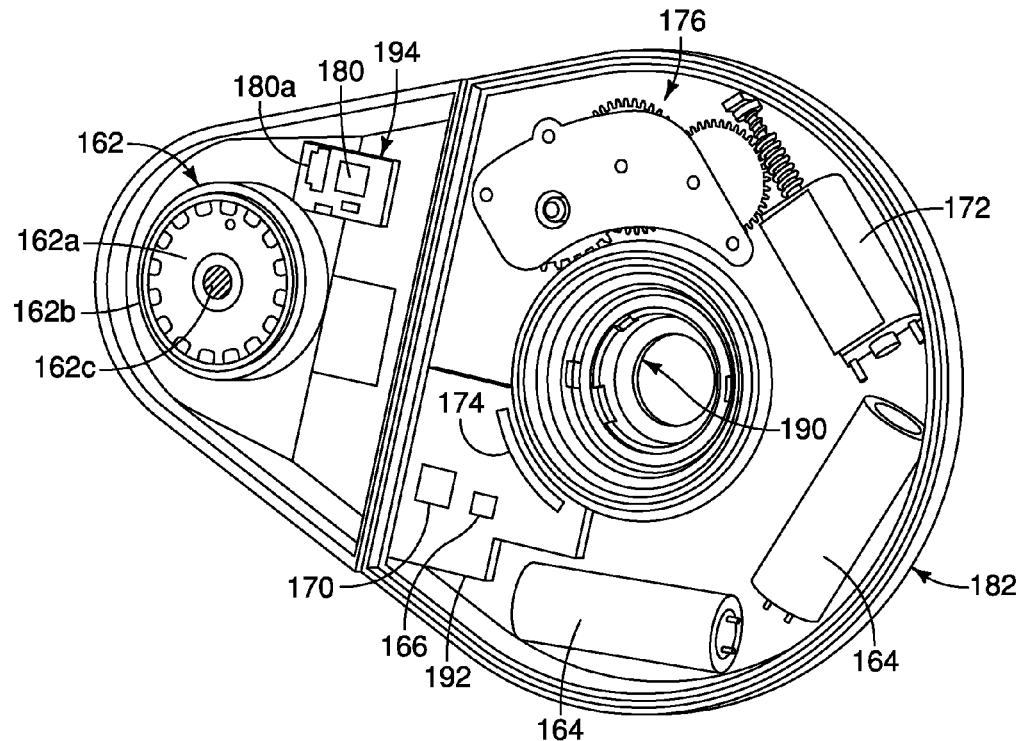
FIG. 14 is a perspective view of the bicycle generator of FIGS. 11 to 13 as viewed from the inbound side of the bicycle generator but with the inbound cover of the base member removed to show selected interior parts.

Similar to the first embodiment, the bicycle generator 114 includes a rotation receiving member 160, a dynamo 162 and an electrical storage unit 164. In the case of the bicycle generator 114 being configured as a bicycle hub transmission shifting device, as seen in FIG. 14, a motor controller 170, an electric motor 172, a potentiometer 174 and a gear reduction unit 176 are further provided. The motor controller 170, the electric motor 172, the potentiometer 174 and the gear reduction unit 176 constitutes a shifting unit. Preferably, the bicycle generator 114 further includes a shift communication unit 180 that is electrically coupled to the motor controller 170 to input control signals to the motor controller 170. The shift communication unit 180 preferably includes a wireless receiver 180*a* that wirelessly receives a wireless shift signal from the wireless transmitter 42. The bicycle generator 114 includes a base member 182 that rotatably supports the rotation receiving member 160. The base member 182 also supports and houses the dynamo 162, the electrical storage unit 164, the power limit circuit 166, the motor controller 170, the electric motor 172, the potentiometer 174, the gear reduction unit 176 and the shift communication unit 180. Preferably, the rotation receiving member 160 is made of a synthetic resin.

As seen in FIG. 14, the dynamo 162 basically includes a stator 162*a* and a rotor 162*b* that form an electric generator. The rotor 162*b* and the stator 162*a* are similar to the stator 62*a* and the rotor 62*b* the first embodiment, and thus, they will not be discussed in further detail. Here in this second embodiment, the rotation receiving member 160 is in the form of a gear or sprocket that is configured and arranged to be operatively coupled to the rear drive sprocket 128. In particular, the teeth of the rotation receiving member 160 directly mesh with the rear drive sprocket 128. The stator 162*a* has its axle 162*c* rotatably coupled to the rotation receiving member 160 and the rotor 162*b* is fixed to the rotation receiving member 160 such that the rotor 162*b* and the rotation receiving member 160 rotate together as a unit in response to the rotation receiving member 160 being rotated by the rear drive sprocket 128. Thus, the rear drive sprocket 128 constitutes one example of a rotational part of the bicycle hub 12. Of course, other gears or sprockets can be located between the rotation receiving member 160 and the rear drive sprocket 128, if needed and/or desired. Similar to the first illustrated embodiment, the three notches 56*a* of the rotational part 56 receive tabs 128*a* of the rear drive sprocket 128 so that they rotate together.

Figure 15:
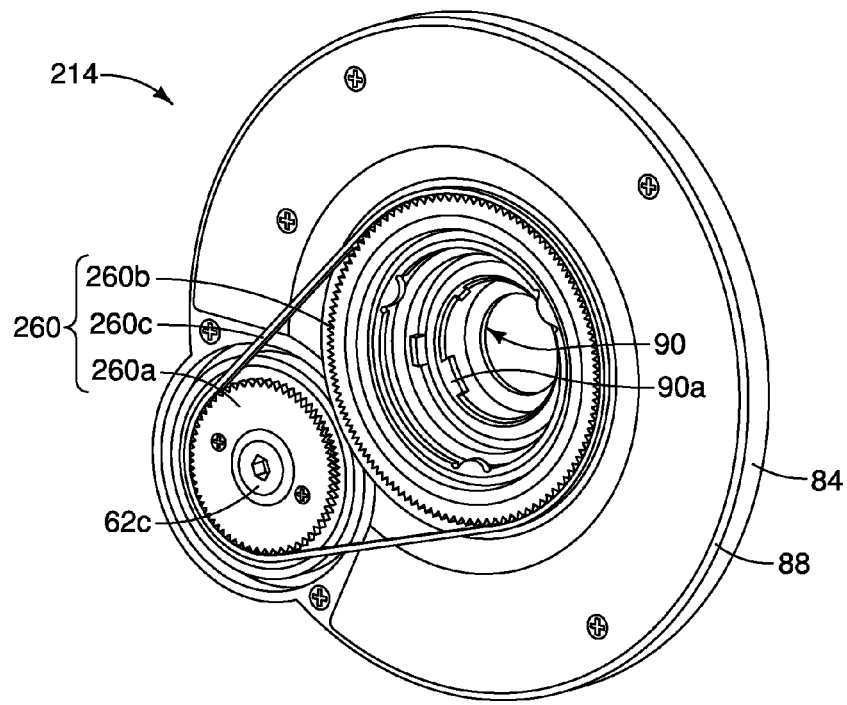
FIG. 15 is a perspective view of a bicycle generator in accordance with a third embodiment as viewed from the inbound side of the bicycle generator.

Referring now to FIG. 15, a bicycle generator 214 is illustrated in accordance with a third embodiment. The bicycle generator 214 is operationally identical to the bicycle generator 14. In fact, the only difference between the bicycle generators 14 and 214 is that the first and second gears 60*a* and 60*b* of the rotation receiving member 60 have been replaced with first and second pulleys 260*a* and 260*b* and a drive belt 260*c* to form a rotation receiving member 260. The drive belt 260*c* preferably is made by synthetic resin. While the drive belt 260*c* is illustrated as have a smooth engagement surface, the drive belt 260*c* may have engagement teeth which engage outer peripheral teeth of the first and second pulleys 260*a* and 260*b* if desired. Alternatively, the first and second pulleys 260*a* and 260*b* may not have those outer peripheral teeth if desired. The remaining parts of the bicycle generator 214 are identical to the bicycle generator 14 of the first embodiment. In view of these similarities between the first and third embodiments, the third embodiment will not be discussed in detail herein. Moreover, the parts of the third embodiment that are identical to the first embodiment will be given the same reference numeral.

The first pulley 260*a* is attached to the dynamo 62. The first pulley 260*a* is rotatably supported by the axle 62*c* and fixed to the rotor 62*b*. In this way, the first pulley 260*a* and the rotor 62*b* rotate together as a unit. The first pulley 260*a* is rotated by the second pulley 260*b* via the drive belt 260*c*. The second pulley 260*b* of the rotation receiving member 260 is configured and arranged to be operatively coupled to the rotational part 56 of the bicycle hub 12 in the same manner as the second gear 60*b* as discussed above.

Above bicycle hub generator may use for general rear hub without transmission. In this case the bicycle hub generator may just include the rotation receiving member 60, the dynamo 62, the electrical storage unit 64 and the power limit circuit 66.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While selected embodiments have been chosen to illustrate the bicycle generator, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle generator comprising:
   a base member configured to be non-rotatably mounted on a fixed hub axle;
   a rotation receiving member rotatably mounted on the base member and configured to be rotated by a rotational part of a bicycle;
   a dynamo supported on the base member and operatively coupled to the rotation receiving member such that the dynamo generates electrical energy in response to rotation of the rotation receiving member;
   an electrical storage unit disposed on the base member and electrically coupled to the dynamo to store electrical energy generated by the dynamo; and
   a rectify device supported on the base member and that rectifies current from the dynamo.

2. The bicycle generator according to claim 1, wherein the rotation receiving member is configured to be connected to a drive member of the rotational part which is rotatably arranged on the hub axle and rotatably arranged relative to a driven member of the rotation receiving member.

3. The bicycle generator according to claim 1, wherein a mounting portion of the base member is located completely within an outer diameter of a hub shell as view from a lateral direction along the hub axle.

4. The bicycle generator according to claim 1, wherein the base member is detachably fixed by a lock member in a lateral direction on the hub axle.

5. The bicycle generator according to claim 1, wherein the electrical storage unit includes at least one of a capacitor and a battery.

6. The bicycle generator according to claim 1, further comprising
   an electric motor unit supported on the base member and electrically coupled to the dynamo, the electric motor unit being configured to change a transmission of a hub.

7. The bicycle generator according to claim 1, further comprising
   a motor controller supported on the base member and electrically coupled to the dynamo.

8. The bicycle generator according to claim 7, further comprising
   a shift communication unit supported on the base member and electrically coupled to the motor controller to input control signals to the motor controller.

9. The bicycle generator according to claim 8, wherein the shift communication unit including a wireless receiver that wirelessly receives a shift signal.

10. The bicycle generator according to claim 7, further comprising
    an electric motor electrically coupled to the motor controller to operate in response to a signal from the motor controller.

11. The bicycle generator according to claim 10, further comprising
    a shifting unit supported on the base member and including the motor, an input member coupled to the electric motor and an output member arranged to engage a part of an internal transmission of the hub.

12. The bicycle generator according to claim 1, further comprising
    a motor controller electrically coupled to the electrical storage unit such that the motor controller receives electrical energy from the electrical storage unit.

13. The bicycle generator according to claim 1, wherein the rotation receiving member includes a gear that is configured and arranged to be operatively coupled to the rotational part, which is a rear sprocket of the bicycle.

14. The bicycle generator according to claim 1, wherein the rotation receiving member includes a first pulley attached to the dynamo, a second pulley that is configured and arranged to be operatively coupled to the rotational part of the bicycle, and a drive belt interconnecting the first and second pulleys.

15. A bicycle hub transmission shifting device comprising:
    a base member having a hub mounting portion non-rotatably mounted on a fixed hub axle;
    a shifting unit supported on the base member and including an electric motor and an output member arranged to engage a part of a bicycle hub transmission;
    a rotation receiving member rotatably mounted on the base member and configured to be rotated by a rotational part of a bicycle;
    a dynamo supported on the base member and operatively coupled to the rotation receiving member such that the dynamo generates electrical energy in response to the rotation receiving member and provides electrical energy to the shift unit; and
    an electrical storage unit disposed on the base member, the electrical storage unit being electrically coupled to the dynamo to store electrical energy generated by the dynamo and being electrically coupled to the electric motor to supply electrical energy from the electrical storage unit.

16. The bicycle hub transmission shifting device according to claim 15, wherein the hub mounting portion of the base member is configured to be mounted only in vicinity of a hub axle of the bicycle.

17. The bicycle hub transmission shifting device according to claim 16, wherein
the rotation receiving member is configured to be connected to a drive member of the rotational part which is rotatably arranged on the hub axle and rotatably arranged relative to a driven member of the rotation receiving member.

18. The bicycle hub transmission shifting device according to claim 16, wherein
the mounted portion of the base member is located completely within an outer diameter of a hub shell as view from a lateral direction along the hub axle.

19. The bicycle hub transmission shifting device according to claim 16, wherein
the base member is detachably fixed by a lock member in a lateral direction on the hub axle.

20. The bicycle hub transmission shifting device according to claim 15, wherein
the electrical storage unit includes at least one of a capacitor and a battery.

21. The bicycle hub transmission shifting device according to claim 15, further comprising
a rectify device supported on the base member and that rectifies current from the dynamo.

22. The bicycle hub transmission shifting device according to claim 15, further comprising
a motor controller supported on the base member and electrically coupled to the dynamo.

23. The bicycle hub transmission shifting device according to claim 22, further comprising
a shift communication unit supported on the base member and electrically coupled to the motor controller to input control signals to the motor controller.

24. The bicycle hub transmission shifting device according to claim 23, wherein
the shift communication unit including a wireless receiver that wirelessly receives a shift signal.

25. The bicycle hub transmission shifting device according to claim 22, wherein
the motor controller automatically controls the electric motor based on at least one of a bicycle speed, a bicycle acceleration, a bicycle deceleration and a bicycle inclination.

26. The bicycle hub transmission shifting device according to claim 15, wherein
the rotation receiving member is configured and arranged to be operatively coupled to the rotational part that is rotatable relative to a hub shell of a hub of the bicycle.

27. The bicycle hub transmission shifting device according to claim 15, wherein
the rotation receiving member includes a gear that is configured and arranged to be operatively coupled to the rotational part, which is a rear sprocket of the bicycle.

28. The bicycle hub transmission shifting device according to claim 15, wherein
the rotation receiving member includes a first pulley attached to the dynamo, a second pulley that is configured and arranged to be operatively coupled to the rotational part of the bicycle, and a drive belt interconnecting the first and second pulleys.

\* \* \* \* \*